(12) United States Patent
Olafson et al.

(10) Patent No.: US 6,432,166 B1
(45) Date of Patent: Aug. 13, 2002

(54) DUST CONTROL

(75) Inventors: Stephen M. Olafson; Michael J. Virnig; G. Timothy Fisher, all of Tucson, AZ (US)

(73) Assignee: Cognis Corporation, Gulph Mills, PA (US)

( * ) Notice: Subject to any disclaimer, the term of this patent is extended or adjusted under 35 U.S.C. 154(b) by 0 days.

(21) Appl. No.: 09/899,354

(22) Filed: Jul. 5, 2001

Related U.S. Application Data

(60) Provisional application No. 60/222,843, filed on Aug. 4, 2000.

(51) Int. Cl.$^7$ ................................................ C22B 3/18
(52) U.S. Cl. ...................... 75/710; 75/743; 252/88.1; 423/DIG. 17
(58) Field of Search ............ 75/710, 743; 423/DIG. 17; 252/88.1

(56) References Cited

U.S. PATENT DOCUMENTS 4,582,689 A    4/1986    Kordosky

OTHER PUBLICATIONS

Copper Bioleaching: State-of-the-Art, Corale L. Brierley, et al., vol. IV—Hydrometallurgy of Copper, pp. 59–68, Proceedings of Copper 99–Cobre 99 International Conference, The Minerals, Metals & Materials Society, 1999.

Bacterial Heap Leaching of Covellite, Sergio Bustos, et al., vol. IV—Hydrometallurgy of Copper, pp. 69–82, Proceedings of Copper 99–Cobre 99 International Conference, The Minerals, Metals & Materials Society, 1999.

*Primary Examiner*—Melvyn Andrews
(74) *Attorney, Agent, or Firm*—John E. Drach; Henry E. Millson, Jr.

(57) ABSTRACT

Process for the control of dust on ore handling points comprising applying to the ore an aqueous solution of an alkyl polyglucoside having an average of from 8 to 12 carbon atoms and a degree of polymerization of from 1.4 to 1.6.

28 Claims, No Drawings

DUST CONTROL

CROSS-REFERENCE TO RELATED APPLICATIONS

This application claims the benefit of provisional application serial No. 60/222,843, filed on Aug. 4, 2000, the entire contents of which are incorporated herein by reference.

FIELD OF THE INVENTION

This invention relates to a method for the control of dust during mining operations.

BACKGROUND OF THE INVENTION

In the mining and processing of ores, ore handling points such as milling, crushing, stockpiling, dump pockets and conveyor belt transfer points give rise to significant airborne dust pollution problems. This is a particular problem with ores such as copper ores since many copper mines are located in arid regions of the world. There are increasing pressures to control dust for environmental reasons as well as for protecting the health of mine workers. Conventional mine dust suppression methods typically comprise spraying a solution of a dust suppressant composition onto surfaces that normally generate dust such as haul roads, etc. These compositions and methods are, however, often not satisfactory for use on ore at transfer points where the ore is dumped from one conveyor belt onto another or dumped from a conveyor belt onto a heap, since such dust suppressant compositions can interfere with further processing of the ore such as leaching and solvent extraction steps. This is a particular problem where bacteria are involved in heap leaching the ore. Dust control agents based on formulations containing conventional surfactants such as nonylphenol ethoxylates, alkylbenzene sulfonates, alcohol ethoxylates, etc., are toxic to these bacteria or are toxic to the bacteria when the quantities of the dust control agents are not closely monitored and controlled.

There is a strong need for dust control agents that can be freely used on ores during crushing, milling, conveying and stockpiling, i.e. dust control agents that do not interfere with the further processing of the ores, including the bioleaching of sulfide ores.

SUMMARY OF THE INVENTION

It has now been discovered that aqueous dust suppressing compositions (dust control agents) containing certain alkyl polyglucosides which exhibit fast wetting times and weak emulsifying properties result in minimal interference with the phase separation step of the solvent extraction process for the recovery of heavy metals from their ores such as the recovery of copper from copper ore using heap, dump, or vat leaching in combination with solvent extraction and electrowinning, and in addition exhibit very low toxicity to the bacteria responsible for leaching copper and other metals from sulfide ores. Hence, the aqueous dust suppressing compositions of the invention can be applied directly to ore crushing, milling and transport, especially on conveyor belts, preferably at conveyor belt transfer points, as highly effective dust control agents.

The alkyl polyglucosides used in the aqueous compositions of the invention have alkyl groups that contain an average of from 8 to 12 carbon atoms and a degree of polymerization of from 1.4 to 1.6. Such alkyl polyglucosides rapidly wet the solid material such as the ore and dust, etc., onto which they are applied, retard the rate of water evaporation from the applied solids, exhibit acceptable foaming levels and are environmentally acceptable in that they are readily biodegradable and exhibit low toxicity and favorable aquatic and eco-toxicity. The present invention accordingly relates to a process for suppressing dust on conveyor belts or at conveyor belt transfer points which comprises contacting the conveyor belt contents with a dust suppressing effective amount of an aqueous solution of an alkyl polyglucoside or alkyl polyglucoside mixture of the formula I $$R_1O(Z)_a \qquad \qquad I$$

wherein $R_1$ is a monovalent alkyl radical having on average from 8 to 12 carbon atoms; Z is a glucose residue; a is a number having a value from 1.4 to 1.6.

The above alkyl polyglucosides and mixtures thereof also provide rapid phase disengagement, clean interface after phase separation, rapid kinetics of metal extraction, good selectivity for metals such as copper over iron extraction, low tendency for foaming, and low viscosity for ease of handling.

DETAILED DESCRIPTION OF THE INVENTION

Other than in the operating examples, or where other indicated, all numbers expressing quantities of ingredients or reaction conditions used herein are to be understood as modified in all instances by the term "about".

While the present methods and compositions can be used with metal ores including metal sulfide ores other than copper ores, the following description will be directed to copper ores for which the invention will most likely have the greatest applicability.

Prior methods and compositions for dust suppression, as discussed above, are not all satisfactory for use in open pit copper oxide ore mining operations using solvent extraction for metal recovery because many of those surfactants used in the spray solutions interfere with the phase separation step. More specifically, in open pit copper mining operations wherein the ore is referred to as oxide ore, the copper is recovered from the ore by leaching with aqueous acid. The leaching is accomplished by trickling aqueous acid, such as dilute sulfuric acid, over and through pieces of ore having a relatively large surface area. The leach solution dissolves salts of copper and other metals as it trickles through the ore, to provide an aqueous solution of the mixture of metal values. The aqueous solution is mixed in tanks with an extraction reagent which is dissolved in an organic solvent, e.g., a hydrocarbon fraction. This is commonly referred to as the organic phase. The reagent includes an extractant chemical which selectively forms metal-extractant complex with the copper ions in preference to ions of other metals. The step of forming the complex is called the extraction or loading stage of the solvent extraction process. The organic phase is transferred to a large settling tank, where the organic solvent, now containing the copper-extractant complex in solution, is separated from the depleted aqueous solution (aqueous phase). This part of the process is called phase separation. Usually, the process of extraction is repeated through two or more mixer/settler stages, in order to more completely extract the desired metal. The process is described in detail in U.S. Pat. No. 4,582,689, the entire contents of which are incorporated herein by reference.

If the ore that is used is coated with conventional surfactants used for dust control and these surfactants enter the leach solution during the leaching step, phase separation does not occur cleanly when the leach solution is mixed with the organic phase during the solvent extraction process. That is, the surfactant acts as an emulsifier, causing the organic and aqueous phases to become suspended in each other thereby retarding the rate of phase separation and increasing entrainment values, thus adding cost to the entire process.

The compositions of the present invention cause minimal interference with the phase separation step, and this is true for sulfide ores as well as for oxidic ores and ores of other chemical composition.

With specific reference to copper sulfide ores and other metal sulfide ores, the sulfide ores are typically bioleached with iron and sulfur oxidizing bacteria, such as *Thiobacillus ferrooxidans, Leptospirillum ferrooxidans, Thiobacillus thiooxidans,* Sulfobacillus species (which naturally develop within bioheaps when the temperature rises above 40° C.), and other microorganisms such as the extremely thermophilic Archaea microorganisms that include Sulfolobus, Acidianus, and Metallosphaera species. In general, some or all of these bacteria are endemic in the ore. In the bioleaching step, iron oxidizing bacteria oxidize ferrous iron to ferric iron which in turn oxidizes the sulfide ion to sulfur, resulting in liberation of the copper from the insoluble sulfide. It has now been discovered that the application of effective quantities of the aqueous dust suppressing compositions of the invention to the sulfide ores during crushing, milling or conveying, preferably at conveyor belt transfer points, does not result in toxic effects on the bacteria during the bioleaching step. In addition, close control over the quantities applied is generally not necessary since toxicity to the bacteria has not been found to be a serious problem.

The term "conveyor belt transfer points" includes the transfer of ore from one conveyor belt onto another, and the dumping of ore from a conveyor belt into a heap. The term "dust" used herein means any particulate solid material that is susceptible to suspension in air or other atmospheric environment. Accordingly, the term dust includes particles having an average diameter of up to 1 mm (though typically only up to about 300 micron) and down into the fume range (e.g. typically as low as 0.001 micrometers). The particulate friable solid will be in a substantially dry, non-fluid environment, e.g. the solid will be comprised of less than about 15% by weight water. The friable solids can have a varying chemical composition. Examples include stones, ore particles, organic materials e.g. sawdust, grain dust, fiber dust, or animal waste, and mineral particles, especial silicic or carbonaceous minerals, e.g. coal dust, soil dust (humus and/or subsoil), gravel dust, fine clay, lime dust, fly ash, and the like.

As discussed above, the alkyl polyglucosides or mixtures thereof that are useful in the process according to the invention are those of the formula I $$R_1O(Z)_a \qquad \mathrm{I}$$

wherein $R_1$ is a monovalent organic radical having an average of from 8 to 12 carbon atoms; Z is a glucose residue; a is a number having a value from 1.4 to 1.6. Such alkyl polyglucosides are commercially available, for example, as APG®, GLUCOPON®, PLANTAREN® or AGRIMUL® surfactants from Cognis Corporation, Ambler, Pa., 19002. Examples of such surfactants include but are not limited to:

1. GLUCOPON® 220 Surfactant—an alkyl polyglucoside in which the alkyl group contains 8 to 10 carbon atoms, an average alkyl group size of about 9.1 carbon atoms, and having an average degree of polymerization of 1.5.
2. APG® 325 Surfactant—an alkyl polyglucoside in which the alkyl group contains 9 to 11 carbon atoms and having an average degree of polymerization of 1.6.
3. GLUCOPON® 425 Surfactant—an alkyl polyglucoside in which the alkyl group contains 8 to 16 carbon atoms, an average alkyl group size of about 10.3 carbon atoms, and having an average degree of polymerization of 1.45. The GLUCOPON® 425N surfactant is identical to GLUCOPON® 425 except that it has been neutralized.

Related Cognis surfactants that are however, outside the scope of the invention, include the following:

1. GLUCOPON® 225 Surfactant—an alkyl polyglucoside in which the alkyl group contains 8 to 10 carbon atoms, an average alkyl group size of about 9.1 carbon atoms, and having an average degree of polymerization of 1.7.
2. GLUCOPON® 625 Surfactant—an alkyl polyglucoside in which the alkyl group contains 12 to 16 carbon atoms, an average alkyl group size of about 12.8 carbon atoms, and having an average degree of polymerization of 1.6.

Solutions of the alkyl polyglucosides are applied to the solid materials on the conveyor belts or at conveyor belt transfer points as described above. These aqueous solutions can be placed in contact with the friable solid material in any manner effective to suppress the generation of dust therefrom, such as by spraying.

The amount of the alkyl polyglucoside in the spray solution is an effective amount which is any amount effective to suppress the generation of dust from the friable solid onto which the solution is applied. Typically, the amount will be from about 5 ppm to about 1000 ppm of alkyl polyglucoside in water with the preferred amount being from about 10 ppm to about 100 ppm.

In addition to the above alkyl polyglucosides, these aqueous solutions can also contain a hydrophilic binder material, such as an acrylic latex or a polysaccharide.

The invention will be illustrated but not limited by the following examples.

EXAMPLES

Example 1

The following dust suppressants were tested by a standard Cognis QC extraction performance test that was conducted using 5 w/v % 5-nonyl-2-hydroxyacetophenone oxime with Cu/Fe aqueous feed spiked with surfactant at the indicated level of active component. The results are set forth in Table 1 below:

TABLE 1

| | | | 50 ppm active, surfactant | | | Undiluted |
|---|---|---|---|---|---|---|
| Surfactant | Ave. C's in the alkyl | Degree of Polym'n | Phase Sep, sec | Interface | Foaming Rate | Viscosity, cps |
| GLUCOPON ® 220 | 9.1 | 1.5 | 96 | clean | 225 ml max | 2800 |
| GLUCOPON ® 425 | 10.3 | 1.6 | 95 | clean | 850 ml max | 550 |

TABLE 1-continued

| Surfactant | Ave. C's in the alkyl | Degree of Polym'n | Phase Sep, sec | 50 ppm active, surfactant Interface | Foaming Rate | Undiluted Viscosity, cps |
|---|---|---|---|---|---|---|
| GLUCOPON® 625[a] | 12.8 | 1.4 | 48 | Some rag | ND | 21,500 |
| DUSTCON®[a] | NR | NR | 200 | Heavy rag | 1200 ml in 3.5 min | ND |

[a]not according to the invention
NR = not relevant
ND = not determined

Discussion

GLUCOPON® 625 is not according to the invention because it's average alkyl group size is 12.8 carbons. DUSTCON® is not according to the invention because it is does not contain an alkyl polyglucoside.

GLUCOPON® 625 is undesirable for two reasons. (1) It contributes to the formation of "rag" at the organic/aqueous interface after phase separation. This is believed due to the higher average carbon length of the alkyl chain, causing a greater tendency to stabilize emulsions. Rag is a relatively stable network of organic film that is suspended from the interface in the aqueous phase. Solvent extraction is normally conducted in continuous mixer-settlers, so that emulsion from the mixer must continuously and rapidly coalesce in the settler. If organic matter, such as "rag", builds up excessively, it will be swept out of the settler with the aqueous phase and be lost from the solvent extraction unit. If the rate of phase separation is too slow (see DUSTCON®), the emulsion itself will be swept out of the settler; this is known as "flooding:, and constitutes an emergency situation that is dealt with by shutdown of the solvent extraction unit or by much slower flow rates. (2) The viscosity of undiluted material is very high. It would need to be diluted several times with water to be practical to handle in a mining situation. Typically, the surfactant is diluted as the application reservoirs are filled with water. This takes place in a very short time, and the turbulence when filling the container provides the agitation to mix and dilute the surfactant from a high concentration (25%–50%) to the application concentration (typically 10–100 ppm). A very high viscosity material would not only be difficult to pump, it would be slow to disperse to a uniform concentration. DUSTCON® is also undesirable for three reasons. (1) Its heavy rag level will promote substantial entrainment of organic phase. (2) The slow phase disengagement rate will tend to cause flooding, limiting the rate at which liquids can be passed through a mixer-settler. (3) The higher tendency for foaming means greater problems when handling solutions.

Example 2

1. Performance Data a. Batch SX Data

The standard Cognis QC extraction performance test was conducted using 5 w/v % 5-nonyl-2-hydroxyacetophenone oxime with Cu/Fe aqueous feed spiked with surfactant at the indicated level of active component. The following abbreviations are used in all the tables below.

1—DUSTCON® is a commercial dust suppressant which is a trademark product of Nalco, Inc.

2—E60 is the copper extraction point at 60 seconds.

3—E300 is the copper extraction point at 300 seconds.

4—Fe300 is the amount of iron extracted at 300 seconds.

5Cu/Fe is the copper/iron ratio.

6—Kinetics refers to the amount of copper extracted at 60 seconds as a % of the amount at 300 seconds.

7—Phase Separation is the time required for the emulsion to separate completely into distinct organic and aqueous phases.

|  | Series 1 | |
|---|---|---|
| Surfactant | None | DUSTCON®[1] |
| ppm Active | Blank | 50 ppm |
| E60, g/l[2] | 3.92, 3.90 | 3.91, 3.99 |
| E300, g/l[3] | 4.17, 3.99 | 4.09, 4.06 |
| Fe300[4], mg/l | 1.2, 1.1 | 3.9, 3.9 |
| Cu/Fe[5] | 3433, 3627 | 1048, 1041 |
| Kinetics[6] | 94, 98% | 96, 98% |
| Phase Sep, sec. | 65, 75 s | 233, 177 s |
|  | clean | heavy rag |

|  | Series 2 | | | |
|---|---|---|---|---|
| Surfactant | Blank | GLUCOPON® 625 | GLUCOPON® 220 | 1:1 GLUCOPON® 625:220 |
| ppm Active | none | 50 ppm | 50 ppm | 25:25 ppm |
| E60, g/l | 3.84, 3.93 | 3.27, 3.27 | 3.79, 3.81 | 3.56, 3.55 |
| E300, g/l | 3.99, 3.99 | 3.91, 3.96 | 4.09, 4.11 | 4.06, 3.99 |
| Fe 300, mg/l | 1.48, 1.48 | 2.42, 2.38 | 1.63, 1.63 | 1.95, 2.01 |
| Cu/Fe | 2696, 2696 | 1616, 1664 | 2509, 2521 | 2082, 1985 |
| Kinetics | 96, 98% | 84, 83% | 93, 93% | 88, 89% |
| Phase Sep sec. | 106, 109 s | 47, 48 s | 97, 94 s | 81, 76 s |
|  | clean | rag | clean | sl. rag |

| | | | Series 3 | | |
|---|---|---|---|---|---|
| Surfactant | Blank | DUSTCON ® | GLUCOPON ® 220 | GLUCOPON ® 425[7] | GLUCOPON ® 425 |
| ppm Active | none | 200 ppm | 200 ppm | 200 ppm | 50 ppm |
| E60, g/l | 3.84, 3.96 | 3.82, 3.89 | 2.61, 2.81 | 2.47, 2.52 | 3.51, 3.53 |
| E300, g/l | 4.05, 4.12 | 3.85, 3.91 | 3.66, 3.70 | 3.47, 3.58 | 4.09, 4.02 |
| Fe 60, mg/l | 2.06, 2.07 | 6.53, 6.36 | 3.27, 3.24 | 4.42, 4.05 | 3.72, 3.90 |
| Cu/Fe | 1864, 1913 | 590, 611 | 798, 827 | 785, 622 | 1099, 905 |
| Kinetics | 95, 96% | 99, 99% | 71, 76% | 71, 70% | 86, 88 |
| Phase Sep sec. | 108, 105 clean | 124, 122 heavy rag | —, 106 rag | 105, 109 s some rag | —, 95 clean |

C. Foaming Data

Dynamic foam cell evaluations were conducted in which the foam level in a 2 L graduated cylinder is measured while circulating the solution and injecting onto the top at 4 L/min. The following data was obtained using 115 ppm hardness water, which corresponds to the water from a commercial mining operation. Times given are those required to reach 1200 ml foam volume, or descriptive results if 1200 ml wasn't reached.

50 ppm Active

DUSTCON®: 3.5 min.

GLUCOPON® 425N: Reached 850 ml in 3 min., then decreased to 600 ml.

GLUCOPON® 220UP: Remained between 200–250 ml foam.

75 ppm Active

DUSTCON®: 2.5 min.

GLUCOPON® 425N: 4 min.

GLUCOPON® 220UP: Reached 450 ml in 2.5 min, then retreated to 300 ml.

100 ppm Active

DUSTCON®: 2.3 min.

GLUCOPON® 425N: 2.7 min.

GLUCOPON® 220UP: Reached 450 ml in 2.5 min, then retreated to 300 ml.

d. Evaporation Rate Data

The table below gives data from two sets of evaporation rate studies. Both were done with haul road soil (with which the metal ores can be contaminated), screened to −30 mesh. Soil in a pan was spray-wetted to 15% moisture using aqueous solutions of surfactants at the indicated ppm actives level. Pans were allowed to dry in 43% relative humidity atmosphere, and were weighed each hour. In the first set, five different conditions were scouted. In the second set, DUSTCON® and GLUCOPON® 425N were compared at 50 ppm active in duplicate tests. As a measure of evaporation rate, the percent of total water loss (equilibrium) which is gone in two hours is given in the following table.

| Surfactant - ppm active | % of Total Water Loss Observed in Two Hours | |
|---|---|---|
| | 1st Set | 2nd Set* |
| DI water | 75.9% | 76.1% |
| DUSTCON ® - 50 ppm | 70.7% | 72.1% |
| GLUCOPON ® 425N - 50 ppm | 65.4% | 68.1% |
| GLUCOPON ® 425N - 200 ppm | 67.1% | |
| GLUCOPON ® 220 - 50 ppm | 66.5% | |

| Surfactant - ppm active | Total Water Loss as % of Initial Weight | |
|---|---|---|
| | 1st Set | 2nd Set* |
| DI water | 13.9% | 13.1% |
| DUSTCON ® - 50 ppm | 13.5% | 13.1% |
| GLUCOPON ® 425N - 50 ppm | 12.8% | 13.2% |
| GLUCOPON ® 425N - 200 ppm | 12.9% | |
| GLUCOPON ® 220 - 50 ppm | | 13.3% |

The time to reach 47 g (roughly equivalent to about 3% moisture remaining in the soil) is:

| Surfactant - ppm active | 1st Set | 2nd Set |
|---|---|---|
| Water | 2.0 hr | 2.1 hr |
| DUSTCON ® 50 ppm | 2.3 hr | 2.4 hr |
| GLUCOPON ® 425N - 50 ppm | 2.7 hr | 2.5 hr |

*average of two determinations

Example 3

Ore slurry tests were performed on dust control agents of the invention to determine their toxicity to iron oxidizing bacteria used in the bioleaching of sulfide ores. The dust control agents of the invention were aqueous (deionized water) solutions of an alkyl polyglucoside in which the alkyl groups contains 8 to 16 carbon atoms, an average alkyl group size of about 10.3 carbon atoms, and the polyglucoside has an average degree of polymerization of 1.45 (GLUCOPON® 425 Surfactant).

A typical low grade ore, primarily chalcocite, was obtained from a mining operation in the Southwestern US and was pulverized to minus 100 mesh. Two 200 gram portions of the dry ore were placed in thin layers in the bottoms of plastic pans (10"×15") and sprayed with either 5 ml of deionized water as a control or 5 ml of 20 ppm GLUCOPON® 425 Surfactant. Each sample of treated ore was then dried at room temperature. 100 grams of each sample was added to 400 ml of Kelly medium (MKM) mineral salts in 1000 ml Erlenmeyer flasks. Each flask was inoculated with 10 ml of a 1:1 by weight mix of a leach solution obtained from a copper mining operation in the Southwestern US which is actively leaching chalcocite ore. This leach solution was collected in sterile bottles and contained bacteria active in the bioleaching of chalcocite ore.

Biooxidation began as rapidly in the flask containing the ore treated with the solution of GLUCOPON® 425 Surfactant as it did in the flask containing the ore treated with the deionized water. The dissolution of iron and copper proceeded at substantially the same rate and to essentially the tent in each flask.

The results obtained are set forth in TABLE 2 below:

TABLE 2

| Day | pH | ml 10 NH$_2$SO$_4$ added | ORP, mV (1) SHE | Dissolved Metals Fe, ppm | Dissolved Metals Cu, ppm | Bacteria cells/ml |
|---|---|---|---|---|---|---|
| CONTROL: UNSPRAYED ORE, UNINOCULATED FLASK | | | | | | |
| 0 (1 hr) | 1.77 | 0 | 582 | 236 | 336 | |
| 2 | 2.65 | 1.0 | 564 | — | — | |
| 4 | 1.96 | 0 | 564 | 257 | 1487 | |
| 6 | 2.06 | 0 | 571 | 292 | 1597 | <10$^6$ |
| 8 | 2.07 | 0 | 574 | 225 | 1638 | |
| 10 | 2.10 | 0.3 | 575 | 306 | 1694 | 1 × 10$^6$ |
| 13 | 1.96 | 0 | 577 | 182 | 1424 | |
| 15 | 2.00 | 0 | 606 | 180 | 1572 | |
| CONTROL: ORE SPRAYED WITH DEIONIZED WATER AND INOCULATED | | | | | | |
| 0 (1 hr) | 1.98 | 0 | 538 | 310 | 323 | |
| 2 | 3.64 | 1.0 | 554 | — | — | |
| 4 | 2.30 | 0.5 | 565 | 297 | 1431 | |
| 6 | 2.24 | 0.5 | 666 | 310 | 1676 | 5 × 10$^6$ |
| 8 | 2.05 | 0 | 757 | 305 | 1805 | |
| 10 | 2.09 | 0.3 | 775 | 446 | 2095 | 3 × 10$^7$ |
| 13 | 1.94 | 0 | 787 | 671 | 2480 | |
| 15 | 1.95 | 0 | 784 | 788 | 2493 | |
| ORE SPRAYED WITH SOLUTION OF GLUCOPON ® 425 SURFACTANT & INOCULATED | | | | | | |
| 0 (1 hr) | 1.98 | 0 | 534 | 314 | 317 | |
| 2 | 3.68 | 1.0 | 552 | — | — | |
| 4 | 2.32 | 0.5 | 564 | 295 | 1449 | |
| 6 | 2.29 | 0.5 | 694 | 270 | 1673 | 5 × 10$^6$ |
| 8 | 2.06 | 0 | 760 | 315 | 1831 | |
| 10 | 2.09 | 0.3 | 783 | 430 | 2075 | 3 × 10$^7$ |
| 13 | 1.94 | 0 | 793 | 676 | 2463 | |
| 15 | 1.95 | 0 | 787 | 740 | 2512 | |

(1) Redox potential

The above results show that the dust suppressing compositions of the invention in dust suppressing quantities do not inhibit and are not toxic to iron oxidizing bacteria when sprayed on sulfide ores.

What is claimed is:

1. A method of suppressing dust at an ore handling point comprising wetting the ore and the dust with an aqueous composition comprising at least one alkyl polyglucoside in which the alkyl group contains an average of from 8 to 12 carbon atoms and the alkyl polyglucoside has degree of polymerization of from 1.4 to 1.6.

2. The method of claim 1 wherein the at least one alkyl polyglucoside has the formula R$_1$O(Z)$_a$ wherein R$_1$ is a monovalent alkyl radical having an average from 8 to 12 carbon atoms, Z is a glucose residue, and a is a number of from 1.4 to 1.6.

3. The method of claim 1 wherein the aqueous composition contains from about 5 ppm to about 1000 ppm of alkyl polyglucoside.

4. The method of claim 3 wherein the aqueous composition contains from about 10 ppm to about 100 ppm of alkyl polyglucoside.

5. The method of claim 2 wherein the alkyl polyglucoside is a mixture in which the alkyl group contains from 8 to 16 carbon atoms.

6. The method of claim 5 wherein the mixture of alkyl polyglucosides has an average degree of polymerization of about 1.45.

7. The method of claim 1 wherein the ore is a copper oxide ore.

8. The method of claim 1 wherein the aqueous composition also contains a hydrophilic binder material.

9. The method of claim 2 wherein the aqueous composition contains from about 5 ppm to about 1000 ppm of alkyl polyglucoside.

10. The method of claim 9 wherein the aqueous composition contains from about 10 ppm to about 100 ppm of alkyl polyglucoside.

11. The method of claim 2 wherein the ore is a copper oxide ore.

12. The method of claim 2 wherein the aqueous composition also contains a hydrophilic binder material.

13. A method of suppressing dust at a sulfide ore handling point comprising wetting the dust and the ore with an aqueous composition comprising at least one alkyl polyglucoside in which the alkyl groups contain an average of from 8 to 12 carbon atoms and the alkyl polyglucoside has a degree of polymerization of from 1.4 to 1.6.

14. The method of claim 13 wherein the aqueous solution contains from about 5 ppm to about 1000 ppm of alkyl polyglucosides.

15. The method of claim 13 wherein the aqueous solution contains from about 10 ppm to about 100 ppm of alkyl polyglucosides.

16. The method of claim 13 wherein the alkyl polyglucoside has a degree of polymerization of about 1.45, and an average alkyl group size of about 10.3 carbon atoms.

17. The method of claim 13 wherein the at least one alkyl polyglucoside has the formula R$_1$O(Z)$_a$ wherein R$_1$ is a monovalent alkyl radical having an average from 8 to 12 carbon atoms, Z is a glucose residue, and a is a number of from 1.4 to 1.6.

18. The method of claim 17 wherein the alkyl polyglucoside is a mixture in which the alkyl group contains from 8 to 16 carbon atoms.

19. The method of claim 18 wherein the mixture of alkyl polyglucosides has an average degree of polymerization of about 1.45.

20. The method of claim 13 wherein the ore is a copper sulfide ore.

21. The method of claim 13 wherein the aqueous composition also contains a hydrophilic binder material.

22. The method of claim 17 wherein the ore is a copper sulfide ore.

23. The method of claim 17 wherein the aqueous composition also contains a hydrophilic binder material.

24. The method of claim 13 wherein the sulfide ore is subsequently bioleached with iron and sulfur oxidizing bacteria.

25. The method of claim 20 wherein the copper sulfide ore is subsequently bio-leached with iron and sulfur oxidizing bacteria.

26. A process for extracting metals from metal ores comprising the steps of
   A) wetting the metal ore and associated dust at one or more ore handling points with an aqueous composition comprising at least one alkyl polyglucoside in which the alkyl group contains an average of from 8 to 12 carbon atoms and the alkyl polyglucoside has degree of polymerization of from 1.4 to 1.6;
   B) forming a metal-pregnant acid leach solution by contacting an aqueous strong acid with the metal ore to produce a metal-pregnant acid leach solution;

C) contacting the resulting metal-pregnant acid leach solution with an oxime extractant in a water-immiscible organic solvent;

D) separating the resulting metal-depleted acid leach solution from the resulting metal-pregnant organic solution;

E) stripping the metal from the metal-pregnant organic solution with an aqueous strip solution; and F) obtaining the metal values from the aqueous strip solution.

27. The process of claim 26 wherein the metal ore is a copper ore.

28. The process of claim 27 wherein the copper ore is a copper sulfide ore which following step A) and prior to step B) is bioleached with iron and sulfur oxidizing bacteria.

* * * * *